United States Patent Office 3,203,949
Patented Aug. 31, 1965

3,203,949
4-HALO-2-BUTYNYL CARBAMATES
Thomas R. Hopkins, Johnson County, and Joe W. Pullen, Overland Park, Kans., assignors, by mesne assignments, to Gulf Oil Corporation, Pittsburgh, Pa., a corporation of Pennsylvania
No Drawing. Filed Jan. 14, 1959, Ser. No. 786,674
The portion of the term of the patent subsequent to Sept. 28, 1976, has been dedicated to the Public
17 Claims. (Cl. 260—207.1)

This invention relates to novel chemical compounds and methods of preparing the same. More particularly, this invention is concerned with 4-halo-2-butynyl carbamate and novel derivatives thereof and processes for producing such compounds.

This application is a continuation-in-part of Serial No. 723,133, filed March 24, 1958, now U.S. Patent No. 2,906,-614.

According to the present invention there is provided a novel class of pesticides of the formula:

$$X-CH_2-C\equiv C-CH_2-O-\overset{O}{\underset{\|}{C}}-N\diagup^{R}_{R_1}$$

wherein X is a halogen, and particularly chlorine or bromine, R is a member of the group consisting of hydrogen, alkyl groups and particularly lower alkyl groups such as methyl, ethyl, propyl, isobutyl, hexyl, octyl and the like, alkenyl groups and particularly lower alkenyl groups such as the allyl and 1-(2-butenyl) groups, aryl and nuclear substituted aryl groups such as the phenyl, naphthyl, biphenylyl, phenylazophenyl, halophenyl, lower alkoxyphenyl, nitrophenyl, hydroxyphenyl, carboxyphenyl, acyloxyphenyl and lower alkylphenyl groups and lower alkylenedioxy phenyl groups like the 3,4-methylenedioxy phenyl group, aralkyl groups such as the phenyl-lower alkyl groups like the benzyl, phenylethyl, o-methylbenzyl, 2-(3,4-methylenedioxyphenyl)ethyl, 3 - (4-chlorophenyl)-propyl and 2-(3-methylphenyl)ethyl groups, cycloalkyl groups such as the cyclopentyl and cycloexyl groups, alkynyl groups such as the propargyl group, hydroxyalkyl groups such as the hydroxyethyl group, heterocyclic groups such as furfuryl, quinolyl, tetrahydrofurfuryl, 4-pyridyl, thiazoyl, thienyl, 3-indolyl, 2-indolyl, 5-hydroxy-3-indolyl, isoxazolyl, imidazolyl, and 2-pyrrolidyl groups, aralkenyl groups such as the styryl group, cycloalkyl-lower alkyl groups like the cyclopentylpropyl and cyclohexylmethyl groups, and $R_1$ represents the same or different groups represented by R except that $R_1$ is not hydrogen when R is an unsubstituted phenyl group, and groups in which

represents heterocyclic groups formed by joining R and $R_1$ so that the nitrogen becomes part of the ring including the piperidino, morpholino, pyrrolidino, isoindolino, 1,2,3,4-tetrahydroisoquinolino, 1,2,3,4-tetrahydroquinolino, tetrahydroisoindolino, piperazino, N-alkylpiperazino, 3-hydroxypiperidino, 4-hydroxypiperidino, indolino and phenothiazino groups.

These novel pesticides can be produced by reacting a 4-halo-2-butynyl halocarbonate with a primary or secondary amine. This process may be represented as follows:

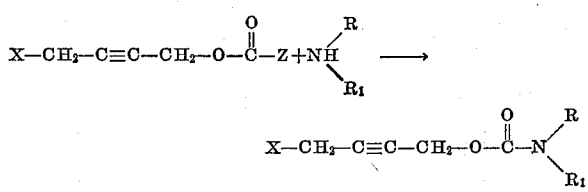

wherein X, R and $R_1$ have the significance previously assigned, and Z is a reactive halogen.

Some of the butyne derivatives which may be used as reactants in this process are 4-chloro-2-butynyl chlorocarbonate and 4-bromo-2-butynyl chlorocarbonate.

Some of the primary and secondary amines which may be used in the reaction are methyl amine, aniline, 4-chloroaniline, 2-bromoaniline, phenylethylamine, cyclohexylamine, allylamine, 1-naphthylamine, N-methyl-4-amino-piperidine, morpholine, pyrrolidine, piperidine, 1-ethyl piperazine and the like.

The reaction is readily effected by bringing the reactants together in the presence of an inert reaction medium. The solvent used is a matter of choice for those skilled in the art although benzene, ether, carbon tetrachloride and chloroform may be used satisfactorily with some of the reactants. Essentially anhydrous reaction conditions are considered desirable since highest yields are thereby attained. Room temperature and somewhat higher, and even lower temperatures therefrom, are suitable for the reaction. At such temperatures the reaction goes to completion in a short time, three hours ordinarily being adequate. A molar excess of the amine or pyridine may be included in the reaction to neutralize the hydrohalide formed in the reaction. Recovery of the product from the reaction mixture can be effected by conventional methods, and the specific method used will be governed somewhat by the solvent used in the reaction.

An alternative process of preparing compounds within the scope of this invention comprises reacting a 4-halo-2-butyn-1-ol with an appropriate isocyanate to produce the desired product. This reaction may be represented as follows:

$$X-CH_2-C\equiv C-CH_2-OH+O=C=N-R \longrightarrow$$

$$X-CH_2-C\equiv C-CH_2-O-\overset{O}{\underset{\|}{C}}-NH-R$$

wherein X and R have the significance previously assigned except that R is not hydrogen or the unsubstituted phenyl group.

Representative of the isocyanates which may be employed are methyl isocyanate, 4-chlorophenyl isocyanate, benzyl isocyanate, 4-nitrophenyl isocyanate, 2-chlorophenyl isocyanate, carboethoxymethylene isocyanate, 2-furfuryl isocyanate, isopropyl isocyanate, cyclopentyl isocyanate, cyclohexyl isocyanate, 4-methoxyphenyl isocyanate, 4-biphenylyl isocyanate and diphenylmethylisocyanate.

This reaction is readily effected employing reaction conditions such as those described previously for the reaction of an amine with a halocarbonate. The presence in the reaction mixture of a basic substance such as pyridine is desirable to catalyze the reaction. The resulting carbamates are relatively insoluble in many solvents so they can be precipitated and recovered by filtration.

Some of the novel compounds produced by one or the other of these processes are 4-chloro-2-butynyl N-(3-chlorophenyl)carbamate,
4-chloro-2-butynyl N-(3-bromophenyl)carbamate,
4-chloro-2-butynyl N-(4-nitrophenyl)carbamate,
4-chloro-2-butynyl N-(2-nitrophenyl)carbamate,
4-chloro-2-butynyl N-(3-nitrophenyl)carbamate,
4-chloro-2-butynyl N-(2-chlorophenyl)carbamate,
4-chloro-2-butynyl N-(4-chlorophenyl)carbamate,
4-chloro-2-butynyl N-(2,5-dichlorophenyl)carbamate,
4-bromo-2-butynyl N-(3-chlorophenyl)carbamate,
4-chloro-2-butynyl N-(2-methylphenyl)carbamate,
4-chloro-2-butynyl N-(3-methylphenyl)carbamate,
4-chloro-2-butynyl N-(4-methylphenyl)carbamate,
4-chloro-2-butynyl N-(2-bromophenyl)carbamate,
4-chloro-2-butynyl N-(2-benzothiazolyl)carbamate,
4-chloro-2-butynyl N-(4-cyanophenyl)carbamate,
4-chloro-2-butynyl N-(4-acetylphenyl)carbamate,
4-chloro-2-butynyl N-(2-naphthyl)carbamate,
4-chloro-2-butynyl N-(1-naphthyl)carbamate,
4-chloro-2-butynyl N-(4-phenylazophenyl)carbamate,
4-chloro-2-butynyl N,N-diphenylcarbamate, As has been previously stated, this class of 4-halo-2-butynyl carbamate derivatives constitutes a new and unexpected series of pesticides. Such compounds are found to have herbicidal, plant growth regulant, nematocidal, fabric protectant, fungicidal, bactericidal or rust eradicant activity. While, obviously, not every compound will have each of these activities, each compound will possess at least one, and generally more than one, such activity.

The plant growth regulating and herbicidal activities of some of the compounds of this invention was evaluated as follows:

A chemical suspension of the compound was made up by adding to 0.5 g. of the compound in a mortar 5 drops of Ultrawet 60L (a product described as an alkyl aryl sulfonate type anionic surface-active agent) and the mixture was ground together in the mortar. A few drops of water and 0.5 ml. of a 5% aqueous methyl cellulose solution was then added. When the mixture was workable, 105 ml. of water was added to convert the suspension into an emulsion. Five ml. of a kerosene emulsion (19% kerosene and 1% Emulphor EL—a polyoxyethylated vegetable oil—and the balance water) was added. Oats (*Avena sativa*), wheat, peas, radishes, flax, soybeans, alfalfa, millet and sugar beets were planted in greenhouse beds in rows 4″ apart. "Bonny Best" tomato plants were grown in pots. When the beds and tomato plants had a suitable growth (3–8″) they were sprayed with the above water emulsion at the rate of 10 lbs. of the carbamate per acre. Two weeks after the application, the plants were observed and the results of treatment recorded as in Table I.

TABLE I.—EFFECTS [a] ON VARIOUS CROPS

| Compound* | Oats | Wheat | Peas | Radishes | Flax | Sugar beets | Alfalfa | Tomatoes | Soybeans | Millet |
|---|---|---|---|---|---|---|---|---|---|---|
| 27 | 4 | G1 | GN1 | G1N1 | G1N1 | | G1N1 | EGN2 | | |
| 1 | 0 | 0 | 0 | N1 | N1 | | N1 | N1 | | |
| 25 | 0 | 0 | G3N2 | 0 | 0 | | 0 | 0 | | |
| 2 | 0 | 0 | N1 | N1 | 0 | | N1 | 0 | | |
| 3 | G1 | 0 | G1 | N1 | 0 | | N1 | EFGN1 | | |
| 4 | 0 | 0 | N1 | 0 | N1 | | 0 | 0 | | |
| 5 | 0 | 0 | G1 | 0 | G1 | | 0 | 0 | | |
| 24 | N3 | N3 | | 4 | | | N1 | N3 | | N3 |
| 14 | 0 | 0 | 0 | N2 | N2 | N1 | N1 | | N3 | N2 |
| 15 | N2 | N1 | 0 | N1 | N1 | 0 | 0 | | N2 | N2 |
| 16 | 0 | 0 | 0 | N1 | N1 | 0 | N1 | | N2 | N1 |
| 12 | 0 | G1 | 0 | N2 | N2 | N2 | N2 | | CN2 | N3 |
| 9 | 0 | 0 | 0 | N2 | N2 | N2 | N2 | | N2 | N2 |
| 26 | 0 | 0 | 0 | 0 | 0 | 0 | 0 | | 0 | GN2 |
| 11 | 0 | 0 | 0 | 0 | 0 | 0 | 0 | | N1 | 0 |
| 19 | 0 | 0 | | N1 | N1 | 0 | 0 | | 0 | 0 |
| 18 | N1 | N1 | | N2 | N2 | N2 | N2 | | N3 | N2 | N2 |
| 29 | G2 | G1 | G1 | G1 | G1 | 0 | | G | | |

[a] Key to ratings:
C=chlorosis. E=epinasty. F=formative effect. G=inhibition of growth. N=necrosis.
0=no effect. 1=slight (less than 25% affected foliage). 2=moderate (25-70% affected foliage). 3=severe (71-99% affected foliage). 4=dead plants.
*Numbers are to the compound of the working example illustrating the production of the compound.

4-chloro-2-butynyl N-(2-chloro-4-nitrophenyl)carbamate,
4-chloro-2-butynyl N-(4-biphenylyl)carbamate,
4-chloro-2-butynyl N-(4-hydroxyphenyl)carbamate,
4-chloro-2-butynyl N-(4-carboxyphenyl)carbamate,
4-chloro-2-butynyl N-furfural carbamate,
4-bromo-2-butynyl N-cyclohexylcarbamate,
4-bromo-2-butynyl N-benzylcarbamate,
4-chloro-2-butynyl N-allylcarbamate,
4-chloro-2-butynyl N-propargyl carbamate,
4-bromo-2-butynyl N-methylcarbamate,
4-bromo-2-butynyl N,N-diethylcarbamate,
4-bromo-2-butynyl-N-phenyl-N-ethylcarbamate,
4-bromo-2-butynyl N-(3-pyridyl)carbamate,
4-chloro-2-butynyl N-(3-indolyl)carbamate,
4-chloro-2-butynyl morpholinocarbamate,
4-bromo-2-butynyl piperidinocarbamate,
4-chloro-2-butynyl-(N'-methylpiperazino)carbamate,
4-chloro-2-butynyl pyrrolidinocarbamate,
4-chloro-2-butynyl isoindolinocarbamate.

These results show compound 27 is specific to oats, compound 26 is specific to millet and compound 25 is specific to peas.

To detect nematocidal activity of the compound in the absence of the complicating soil factor the following test was performed:

To prepare a chemical suspension, 0.2 g. of the compound was weighed into a mortar, 2 drops of Emulphor EL (a wetting agent) and 2 drops of a 5% aqueous methyl cellulose solution were added, an emulsion made and the volume brought up to 134 ml. with water. The suspension was diluted to give final dilutions containing 500, 50 and 5 p.p.m. of the compound. To each dilution in a test tube was added 2 drops of a suspension of Panagrellus nematode larvae containing at least 150 larvae, and the test tubes stoppered. After 7 days, the contents of the test tubes were observed. When all of the nematodes are read, the compound is recorded as effective. The concentration at which a complete kill is obtained was recorded. The results are given in the following table.

TABLE II

| Compound:[1] | Lowest effective concentration (p.p.m.) after seven days |
|---|---|
| 14 | 500 |
| 15 | 50 |
| 13 | 5 |
| 12 | 50 |
| 9 | 500 |
| 6 | 500 |
| 11 | 500 |
| 19 | 500 |

[1] Numbers are to the compound of the working example illustrating the production of the compound.

In a nematocide pot test in which the compounds are tested in soil, compound 24 gave 99% kill at 100#/acre and compound 29 gave 100% kill at 10#/acre.

The following test was to determine the effectiveness of the compounds as fungicides:

Agar plates were made up using 20 ml. of Czapek solution agar (Difco 0339). The agars were sterilized and adjusted to pH 4.5 with hydrochloric acid. The agars were then inoculated with soil extract. Filter paper discs (Chicago Apparatus Company 24495) were dipped into 1% acetone solutions of the compound, dried and then placed in the center of the agar plates. The plates were incubated at 100° F. After 2–4 days the clear zone in the Czapek agar was measured. The results are recorded in Table III.

TABLE III

| Compound:[1] | Agar diameter (mm.) of clear zone Czapek |
|---|---|
| 27 | 20 |
| 25 | 22 |
| 2 | 30 |
| 3 | 30 |
| 5 | 13 |
| 24 | 26 |
| Untreated check | 0 |

[1] Numbers are to the compound of the working example illustrating the production of the compound.

Compounds 2 and 27 were found to be 89 and 99% effective at 400 p.p.m. against wheat rust (*Puccinia rubigovera tritici*).

The following examples illustrate the preparation of specific compounds within the scope of this invention:

EXAMPLE 1

*4-chloro-2-butynyl N-(4-nitrophenyl)carbamate*

A benzene solution (100 ml.) of 10.4 g. (0.1 mole) of 4-chloro-2-butyn-1-ol, 16.4 g. (0.1 mole) of 4-nitrophenyl isocyanate and 3 drops of pyridine was refluxed for 3 hours. The solution was filtered and about 200 ml. of n-hexane added to the filtrate. The crystalline precipitate was removed by filtration and air-dried. Recrystallization from a n-hexane–benzene mixture gave 11.8 g. (44%) of crystalline product. Further recrystallization gave the pure product melting at 129–129.5° C.

EXAMPLE 2

*4-chloro-2-butynyl N-(3-nitrophenyl)carbamate*

4-chloro-2-butyn-1-ol (0.1 mole), 3-nitrophenyl isocyanate (0.1 mole) and 5 drops of pyridine were refluxed in a benzene solution as in Example 1 to give 20 g. (75%) of crystalline product melting at 92–94° C. The recrystallized product melted at 92–93.5° C.

EXAMPLE 3

*4-chloro-2-butynyl N-(2-chlorophenyl)carbamate*

4-chloro-2-butyn-1-ol (0.1 mole), 2-chlorophenyl isocyanate (0.1 mole) and 3 drops of pyridine were refluxed in benzene as described in Example 1 to give 11.4 g. (44%) of crystalline product melting at 37–39° C.

EXAMPLE 4

*4-chloro-2-butynyl N-(4-chlorophenyl)carbamate*

4-chloro-2-butyn-1-ol (0.1 mole), 4-chlorophenyl isocyanate (0.1 mole) and 5 drops of pyridine were refluxed in benzene as described in Example 1 to give 18.6 g. (72%) of crystalline product melting at 102–104° C.

EXAMPLE 5

*4-chloro-2-butynyl N-(2,5-dichlorophenyl)carbamate*

4-chloro-2-butyn-1-ol (0.1 mole), 2,5-dichlorophenyl isocyanate (0.1 mole) and 5 drops of pyridine were refluxed in benzene as described in Example 1 to give 9.7 g. (33%) of crystalline product melting at 69–71° C. Recrystallization raised the melting point to 70–71° C.

EXAMPLE 6

*4-chloro-2-butynyl N-(4-bromophenyl)carbamate*

To a mixture of 17.2 g. (0.1 mole) of 4-bromoaniline and 7.9 g. (0.1 mole) of pyridine in 50 ml. of ether was added 16.7 g. (0.1 mole) of 4-chloro-2-butynyl chlorocarbonate at 35° C. The resulting mixture was washed with water, the ether layer separated and concentrated to a solid residue. The residue was dissolved in benzene, n-hexane added and the mixture cooled to precipitate the crystalline product, which was removed by filtration. Recrystallization of the crude product from benzene–n-hexane gave a white, crystalline product melting at 101–103° C.

EXAMPLE 7

*4-chloro-2-butynyl N-(4-acetophenyl)carbamate*

The reaction of 0.1 mole of 4-chloro-2-butynyl chlorocarbonate and 0.1 mole of 4-aminoacetophenone in the presence of 0.1 mole of pyridine as described in Example 6 gave 24 g. (90%) of crude product which when purified by recrystallization melted at 142–144° C.

EXAMPLE 8

*4-chloro-2-butynyl N-(4-phenyl-phenyl)carbamate*

To a mixture of 16.9 g. (0.1 mole) of 4-aminobiphenyl and 7.9 g. (0.1 mole) of pyridine in 100 ml. of ether was added 16.7 g. (0.1 mole) of 4-chloro-2-butynyl chlorocarbonate at 35° C. The mixture was allowed to stand at room temperature for about 1 hour and then washed with water. The ether layer was dried and the ether removed by distillation under reduced pressure to give a solid residue weighing 24.1 g. (81%). The residue was dissolved in benzene and n-hexane added to precipitate crude product melting at 87–89° C. Recrystallization gave the purified product as a white powder melting at 89–90° C.

EXAMPLE 9

*4-chloro-2-butynyl N-(2-benzothiazoyl)carbamate*

To a solution of 15.0 g. (0.1 mole) of 2-aminobenzothiazole in 100 ml. of acetone was added 16.7 g. (0.1 mole) of 4-chloro-2-butynyl chlorocarbonate at about 20–40° C. A white precipitate formed which was removed by filtration to give 21 g. melting at 213–215° C. (dec.). Recrystallization from absolute ethanol gave purified product melting at 197° C. (dec.) having the following analysis:

| | Calculated | Found |
|---|---|---|
| Carbon | 51.34 | 51.6 |
| Hydrogen | 3.24 | 3.2 |
| Chlorine | 15.5 | 14.9 |

EXAMPLE 10

*4-chloro-2-butynyl N-(beta-naphthyl)carbamate*

To a mixture of 14.3 g. (0.1 mole) of beta-naphthylamine and 7.9 g. (0.1 mole) of pyridine in 100 ml. of benzene was added 16.7 g. (0.1 mole) of 4-chloro-2-butynyl chlorocarbonate at about 60–80° C. After standing for about 1 hour the benzene solution was washed with water, dried and then poured into cold n-hexane. The crude crystalline product (20 g.; 73%) which was recovered by filtration, melted at 83–84° C. Recrystallization from a n-hexane–benzene mixture gave the pure product melting at 84–85° C.

EXAMPLE 11

*4-chloro-2-butynyl N-(alpha-naphthyl)carbamate*

Alpha-naphthylamine (0.1 mole) was reacted with 4-chloro-2-butynyl chlorocarbonate (0.1 mole) in the presence of pyridine as described in Example 6. The crude product was washed thoroughly twice with water and air-dried. The crude material was then dissolved in hot benzene, filtered and diluted with n-hexane. Cooling precipitated 21.0 g. (77%) of crude product which was collected by filtration and melted at 101–103° C. Recrystallization from an ethanol-water mixture gave the purified product melting at 103–104° C.

EXAMPLE 12

*4-chloro-2-butynyl N-(2-methoxyphenyl)carbamate*

To a mixture of 12.3 g. (0.1 mole) of o-anisidine and 7.9 g. (0.1 mole) of pyridine in 50 ml. of ether was added 16.7 g. (0.1 mole) of 4-chloro-2-butynyl chlorocarbonate at about 35° C. The resultant mixture was cooled and extracted twice with water and the ether layer separated and dried. The ether was removed by distillation under reduced pressure to give 21 g. (82%) of an oil, which did not crystallize.

EXAMPLE 13

*4-chloro-2-butynyl N-(4-methylphenyl)carbamate*

17.0 g. (0.1 mole) of 4-chloro-2-butynyl chlorocarbonate was added dropwise at 10–15° C. to a stirred benzene solution (200 ml.) of 10.7 g. (0.1 mole) of p-toluidine and 7.9 g. (0.1 mole) of pyridine over a period of about 30 minutes. Stirring was continued for 3 hours and then the solution poured into 600 ml. of water, stirred and the benzene layer separated. The benzene layer was dried over magnesium sulfate, filtered and the filtrate diluted with about 600 ml. of n-hexane precipitating a crystalline solid which was removed by filtration. After washing with n-hexane and drying, the product weighed 16 g. (67.5%) and melted at 92–94° C. After recrystallization from n-hexane, the purified product melted at 93–94° C.

EXAMPLE 14

*4-chloro-2-butynyl N-(2-methylphenyl)carbamate* o-Toluidine was reacted with 4-chloro-2-butynyl chlorocarbonate as described in Example 6 to give 10.1 g. (42.6%) of crystalline product melting at 48–49° C.

EXAMPLE 15

*4-chloro-2-butynyl N-(3-methylphenyl)carbamate* m-Toluidine was reacted with 4-chloro-2-butynyl chlorocarbonate as described in Example 6 to give 14.2 g. (60%) of product melting at 47–48° C. Recrystallization gave the pure product melting at 47.5–48.5° C.

EXAMPLE 16

*4-chloro-2-butynyl N-(2-bromophenyl)carbamate*

2-bromoaniline was reacted with 4-chloro-2-butynyl chlorocarbonate as described in Example 6 to give 13 g. (43%) of crude product melting at 54–55° C. Recrystallization raised the melting point to 55–56° C.

EXAMPLE 17

*4-chloro-2-butynyl N-methyl-N-phenylcarbamate*

N-methylaniline (10.7 g.; 0.1 mole) was reacted with 17.0 g. (0.1 mole) of 4-chloro-2-butynyl chlorocarbonate in the presence of pyridine as described in Example 6. No crystalline material precipitated upon dilution with hexane and chilling. The hexane and benzene were removed by distillation under reduced pressure and the residual solvent removed by maintaining the residue at 4 mm. Hg pressure for 4 hours. The residual liquid weighed 20.8 g. (88%); $N_D^{24}=1.5454$ and analyzed as follows:

|  | Calculated | Found |
| --- | --- | --- |
| Carbon | 60.7 | 57.6 |
| Hydrogen | 5.1 | 4.85 |

EXAMPLE 18

*4-chloro-2-butynyl N-(2-chloro-4-nitrophenyl)carbamate*

To a stirred benzene solution (400 ml.) of 17.3 g. (0.1 mole) of 2-chloro-4-nitroaniline and 7.9 g. (0.1 mole) of pyridine was added dropwise with stirring 17.0 g. (0.1 mole) of 4-chloro-2-butynyl chlorocarbonate at 10–15° C. Stirring was continued for 2 hours, the reaction mixture poured into 500 ml. of water and stirred, then filtered. The benzene layer was separated from the filtrate, dried over magnesium sulfate and diluted with 600 ml. of n-hexane. After standing about 1 hour, the yellow precipitate was removed by filtration and dried to give 11.1 g. (36%) of the product melting at 72–74° C. Recrystallization raised the melting point to 74–75° C. and the material analyzed as follows:

|  | Calculated | Found |
| --- | --- | --- |
| Carbon | 43.5 | 42.9 |
| Hydrogen | 2.6 | 2.9 |

EXAMPLE 19

*4-chloro-2-butynyl N,N-diphenylcarbamate*

To a stirred benzene solution (250 ml.) of 16.9 g. (0.1 mole) of diphenylamine and 7.9 g. (0.1 mole) of pyridine was added dropwise, at 15–20° C., 17.0 g. (0.1 mole) of 4-chloro-2-butynyl chlorocarbonate over a period of 1 hour. Stirring was continued for an additional 2 hours and the reaction mixture then poured into water. The benzene layer was separated and washed with cold dilute hydrochloric acid, then water and dried over magnesium sulfate. The benzene was removed by distillation under reduced pressure and the residual volatile material removed by maintaining the residue under 4 mm. Hg pressure for 4 hours. The residual liquid weighed 28 g. (93%); $N_D^{20}=1.5987$, and analyzed as follows:

|  | Calculated | Found |
| --- | --- | --- |
| Carbon | 68.5 | 69.2 |
| Hydrogen | 4.7 | 5.2 |

EXAMPLE 20

*4-chloro-2-butynyl N-(4-phenylazophenyl)carbamate*

To a stirred mixture of 19.7 g. (0.1 mole) of p-aminoazobenzene and 7.9 g. (0.1 mole) of pyridine in 300 ml. of benzene was added dropwise with stirring 17.0 g. (0.1 mole) of 4-chloro-2-butynyl chlorocarbonate at about 15–20° C. Stirring was continued for 4 hours and the mixture then poured into 1 liter of water and stirred. The insoluble crystalline material was removed by filtration to give 9.9 g. melting at 130–131° C. The benzene layer was separated from the filtrate and diluted with n-hexane to precipitate 12.7 g. of crystalline product melting at 129–130° C. which was collected by filtration. The combined crystalline products were recrystallized from benzene–n-hexane to give the purified crystalline product melting at 130–131° C.

EXAMPLE 21

4-chloro-2-butynyl N-(4-hydroxyphenyl)carbamate

To a stirred solution of 10.9 g. (0.1 mole) of 4-aminophenol and 7.9 g. (0.1 mole) of pyridine in 200 ml. of acetone was added dropwise 17.0 g. (0.1 mole) of 4-chloro-2-butynyl chlorocarbonate at 10–15° C. Stirring was continued for 3 hours at ambient temperature and the mixture then poured into 1 liter of water. The oil which separated crystallized and was removed by filtration. The crude product was collected by filtration, recrystallized from benzene and decolorized with activated carbon to give 9.5 g. melting at 122–123° C.

EXAMPLE 22

4-chloro-2-butynyl N-(4-carboxyphenyl)carbamate p-Aminobenzoic acid (0.1 mole) was reacted with 0.1 mole of 4-chloro-2-butynyl chlorocarbonate as described in Example 6. The crude crystalline product obtained from the acetone–water mixture was recrystallized from benzene–acetone and then dissolved in cold dilute sodium hydroxide solution, the solution filtered and the filtrate acidified with dilute hydrochloric acid. The crystalline precipitate was removed by filtration and dried to yield 18.6 g. which appeared to shrink slightly at 170° C. and melted at 180–184° C. The product analyzed as follows:

|  | Calculated | Found |
| --- | --- | --- |
| Percent Carbon | 53.9 | 54.2 |
| Percent Hydrogen | 3.8 | 4.0 |

EXAMPLE 23

4-chloro-2-butynyl N-furfuryl carbamate

To a stirred mixture of 9.7 g. (0.1 mole) of furfurylamine and 7.9 g. (0.1 mole) of pyridine in 200 ml. of benzene was added dropwise, at 10–15° C., 17.0 g. (0.1 mole) of 4-chloro-2-butynyl chlorocarbonate. Stirring was continued for 3 hours and the mixture then poured into an equal volume of water. The benzene layer was separated and dried over calcium chloride. Dilution of the dried benzene solution with 700 ml. of n-hexane and chilling precipitated 8.5 g. (37%) of crude material melting at 48–52° C. Recrystallization from a n-hexane–benzene mixture gave the pure product melting at 52–52.5° C.

EXAMPLE 24

4-chloro-2-butynyl carbamate

To a solution of 20 g. of 4-chloro-2-butynyl chlorocarbonate in 250 ml. of benzene was passed in ammonia for 15 min. The mixture was then poured into the 400 ml. of n-hexane and the crystalline precipitate removed by filtration. The crystalline material was slurried with dioxane, filtered and the filtrate diluted with n-hexane thereby precipitating the crystalline product. Isolation by filtration gave 6.8 g. which melted at 92–94° C. Recrystallization gave the purified product melting at 95–96° C.

EXAMPLE 25

4-chloro-2-butynyl N-(2-nitrophenyl)carbamate

A benzene solution (100 ml.) of 10.4 g. (0.1 mole) of 4-chloro-2-butyne-1-ol, 16.4 g. (0.1 mole) of 2-nitrophenyl isocyanate and 3 drops of pyridine was refluxed for 3 hours. The solution was cooled and filtered. Approximately 200 ml. of n-hexane was added to the filtrate, the solution cooled in an ice bath and the crystalline product removed by filtration. Recrystallization from benzene after treatment with activated carbon gave 7.8 g. of yellow crystals. The purified product (yellow needles) melted at 67–68° C. and analyzed as follows:

|  | Percent C | Percent H |
| --- | --- | --- |
| Calculated | 49.2 | 3.4 |
| Found | 49.4 | 3.4 |

EXAMPLE 26

4-chloro-2-butynyl N-(4-cyanophenyl)carbamate

To a mixture of 11.8 g. (0.1 mole) of 4-cyanoaniline and 7.9 g. (0.1 mole) of pyridine in 50 ml. of ether was added 16.7 g. (0.1 mole) of 4-chloro-2-butynyl chlorocarbonate at approximately 35° C. The ether layer was diluted with 50 ml. of additional ether, extracted with water and dried over sodium sulfate. One hundred milliliters of n-hexane was added, the solution cooled and filtered to isolate 21 g. (85%) of crude product. Recrystallization from a benzene–n-hexane mixture gave 12 g. which melted at 130–132° C. The purified product melted at 133–134° C. and analyzed as follows:

|  | Percent C | Percent H |
| --- | --- | --- |
| Calculated | 58.0 | 3.6 |
| Found | 58.2 | 3.7 |

EXAMPLE 27

4-chloro-2-butynyl N-(3-chlorophenyl)carbamate

A benzene solution (100 ml.) of 10.4 grams (0.1 mole) of 4-chloro-2-butyn-1-ol, 15.3 grams (0.1 mole) of 3-chlorophenyl-isocyanate and 3 drops of pyridine was refluxed for 3 hours. The cooled solution was then diluted with approximately twice its volume of petroleum ether and the crystalline product removed by filtration. Recrystallization of the crude product from a mixture of n-hexane and benzene gave 16.5 grams (64%) of product which melted at 71–73° C. Further recrystallizations raised the melting point to 75–76° C.

*Analysis.*—Calcd. for $C_{11}H_9O_2Cl_2N$: C, 51.2; H, 3.5. Found: C, 50.7; H, 3.2.

EXAMPLE 28

4-bromo-2-butynyl N-(3-chlorophenyl)carbamate 4-bromo-2-butynyl N-(3-chlorophenyl)carbamate was prepared by the reaction of 3-chlorophenyl isocyanate with 4-bromo-2-butyn-1-ol as described in Example 27. The crystalline product melted at 76–78° C. and analyzed as follows:

*Analysis.*—Calcd. for $C_{11}H_9O_2BrClN$: C, 43.7; H, 3.0. Found: C, 43.33; H, 3.1.

EXAMPLE 29

4-chloro-2-butynyl N-(3-bromophenyl)carbamate

To a stirred solution of 68.8 grams (.04 mole) of 3-bromoaniline in 300 ml. of chloroform was slowly added 33.4 grams (0.2 mole) of 4-chloro-2-butynyl chloroformate at 10–15° C. and the stirring continued for an hour. The crystalline 3-bromoaniline hydrochloride was removed by filtration and the chloroform filtrate diluted with approximately one liter of hexane. After standing approximately 30 minutes, the crystalline product which had precipitated was removed by filtration to give 52 grams (86%) of product. Recrystallization from a benzene–n-hexane mixture gave soft fibrous crystals which melted at 78–78.5° C. and analyzed as follows:

*Analysis.*—Calcd. for $C_{11}H_9O_2BrClN$: C, 43.7; H, 3.0. Found: C, 44.1; H, 3.28.

EXAMPLE 30

*Phenylene 1,2-bis(4-chloro-2-butynyl)carbamate*

To a stirred solution of 5.4 g. (0.05 mole) of o-phenylenediamine and 4.0 g. (0.05 mole) of pyridine in 150 ml. of acetone was added dropwise, at 15–20° C., 17.0 g. (0.1 mole) of 4-chloro-2-butynyl chlorocarbonate. The solution was then stirred for two hours. The solution was filtered to remove a crystalline precipitate and the acetone filtrate then diluted with water, precipitating a dark oil. Hydrochloric acid was added, whereupon the oil slowly crystallized. The crystals were removed by filtration, washed with water, and air dried. Recrystallization from a benzene-hexane mixture after treatment with decolorizing carbon gave 6 g. (32%), melting at 120–121° C.

EXAMPLE 31

*4-chloro-2-butynyl N-(2-methyl-5-nitrophenyl)carbamate*

To a stirred solution of 7.6 g. (0.05 mole) of 4-nitro-2-aminotoluene and 0.05 mole of pyridine in 150 ml. of benzene was added dropwise, at about 15–20° C., 8.5 g. (0.05 mole) of 4-chloro-2-butynyl chlorocarbonate. Stirring was continued for two hours and the crystalline precipitate removed by filtration. The crude product was treated with 500 ml. of water, filtered and dried. Upon recrystallization from a benzene-hexane mixture 10.1 g. (80%) of pure carbamate which melts at 133–134° C. was obtained.

EXAMPLE 32

*4-chloro-2-butynyl N-(2-nitro-4-methylphenyl)carbamate*

To a stirred solution of 0.05 mole of 3-nitro-4-aminotoluene and 0.05 mole of pyridine in 150 ml. of benzene was added dropwise, at 15–20° C., 0.05 mole of 4-chloro-2-butynyl chlorocarbonate. The mixture was then stirred for three hours and filtered. The filtrate was diluted with n-hexane, chilled, and the yellow precipitate removed by filtration. Recrystallization of the yellow, crude product from n-hexane gave 10.5 g. (74%) of fluffy, yellow crystals melting at 65–66° C.

EXAMPLE 33

*4-chloro-2-butynyl N-(2-methyl-3-chlorophenyl)carbamate*

To a stirred mixture of 0.1 mole of 3-chloro-2-methylaniline and 10 ml. of pyridine in 150 ml. of benzene was added dropwise, at 10–15° C., 0.1 mole of 4-chloro-2-butynyl chlorocarbonate. Stirring was continued for 3 hours at ambient temperature. The insoluble precipitate was removed by filtration and the filtrate diluted with n-hexane, precipitating additional crystalline product. The two crops of crystalline material were combined, slurried in water, filtered, and dried to give 22.1 g. (81%) of crude crystalline product. Recrystallization from a benzene-hexane mixture gave the crystalline carbamate melting at 88–89° C.

EXAMPLE 34

*4-chloro-2-butynyl N-(2-methyl-4-chlorophenyl)carbamate*

4-chloro-2-methylaniline hydrochloride (0.1 mole) and 0.1 mole of 4-chloro-2-butynyl chlorocarbonate were reacted in the presence of 20 ml. of pyridine in a benzene solution as described above. The crude crystalline product was recrystallized from benzene-hexane to give 11.1 g. (41%) of the carbamate melting at 90–91° C.

EXAMPLE 35

*4-chloro-2-butynyl N-(2-bromo-4-methylphenyl)carbamate*

2-bromo-4-methylaniline (0.025 mole) was reacted with 4-chloro-2-butynyl chlorocarbonate (0.025 mole) in the presence of 5 ml. of pyridine in benzene as described above. The crystalline product melted at 81–82.5° C.

EXAMPLE 36

*4-chloro-2-butynyl N-(2,4-dimethylphenyl)carbamate*

2,4-dimethylaniline (0.05 mole) was reacted with 4-chloro-2-butynyl chlorocarbonate (0.05 mole) in the presence of 5 ml. of pyridine in benzene as described above. The reaction mixture was added to water, the benzene layer separated, dried, and then diluted with n-hexane. The crude crystalline product which precipitated was removed by filtration and recrystallized from a benzene-n-hexane mixture to give 7.1 g. of product melting at 81–82.5° C.

EXAMPLE 37

*4-chloro-2-butynyl N-(2,5-dimethoxyphenyl)carbamate*

2,5-dimethoxyaniline (0.05 mole) was reacted with 4-chloro-2-butynyl chlorocarbonate (0.05 mole) in the presence of 5 ml. of pyridine in benzene as described above. The reaction mixture was poured into water, stirred, the benzene layer separated and dried. Dilution of the benzene layer with n-hexane and chilling precipitated the crude product which was removed by filtration. Recrystallization from a benzene–n-hexane mixture gave the pure carbamate melting at 45–46° C.

EXAMPLE 38

*4-chloro-2-butynyl N-dodecylcarbamate*

To a stirred solution of 18.5 g. (0.1 mole) of dodecylamine and 7.9 g. (0.1 mole) of pyridine in 150 ml. of benzene was added dropwise, at 10–15° C., 16.7 g. (0.1 mole) of 4-chloro-2-butynyl chlorocarbonate. The mixture was stirred for 4 hours at 10–15° C. and then 1 hour at 20° C. The mixture was then poured into 200 ml. of water and the resulting mixture saturated with sodium chloride. After standing overnight, the benzene layer was separated and dried over sodium sulfate. An equal volume of n-heptane was added, the solution cooled, thereby precipitating crystalline material which was removed by filtration. Purification of the crude product by recrystallization from benzene and n-heptane gave the pure carbamate melting at 184–186° C.

EXAMPLE 39

*4-chloro-2-butynyl N-benzylcarbamate*

Benzylamine (10.7 g., 0.1 mole) was reacted with 4-chloro-2-butynyl chlorocarbonate (16.7 g.; 0.1 mole) in the presence of 0.1 mole of pyridine in benzene as described above. The benzene solution was poured into water, separated and dried over sodium sulfate and magnesium sulfate. An equal volume of n-hexane was added to the solution, precipitating the crystalline product which was removed by filtration. Recrystallization from n-hexane gave the pure carbamate melting at 70–71° C.

EXAMPLE 40

*4-chloro-2-butynyl N-cyclohexylcarbamate*

To a stirred solution of 9.9 g. (0.1 mole) of freshly distilled cyclohexylamine and 7.9 g. (0.1 mole) of pyridine in 150 ml. of benzene was added dropwise, at about 10° C., 16.7 g. (0.1 mole) of 4-chloro-2-butynyl chlorocarbonate over a period of about 30 minutes. The reaction mixture was then stirred for 2 hours and allowed to stand overnight. The mixture was washed with three 200 ml. portions of water, three 30 ml. portions of dilute hydrochloric acid and then with three 75 ml. portions of water.

After drying over anhydrous sodium sulfate and magnesium sulfate the benzene solution was diluted with twice its volume of n-hexane, cooled and the crystalline precipitate removed by filtration. Recrystallization from benzene and n-hexane gave the pure carbamate melting at 92–94° C.

EXAMPLE 41

4-chloro-2-butynyl N-(2-thiazoyl)carbamate

To a stirred solution of 10 g. (0.1 mole) of 2-aminothiazole and 7.9 g. (0.1 mole) of pyridine in 150 ml. of ether and 50 ml. of benzene was added dropwise, at about 10° C., 16.7 g. (0.1 mole) of 4-chloro-2-butynyl chlorocarbonate. The mixture was then stirred at 10–15° C. for 2 hours, allowed to stand at room temperature overnight and again stirred for 1 hour at room temperature. The resulting solution was washed with 300 ml. of water, then with dilute sodium bicarbonate, and finally with water. A light tan solid material which remained in the water layer was shaken with a mixture of benzene and dilute sodium bicarbonate, the benzene layer removed, washed with water and combined with the ether-benzene solution. After drying the combined ether-benzene solutions over anhydrous sodium sulfate and magnesium sulfate, a large excess of n-hexane was added, the solution cooled and the crystalline precipitate removed by filtration. Recrystallization from benzene and n-hexane gave the pure carbamate melting at 142–143° C.

EXAMPLE 42

4-chloro-2-butynyl N-(2,4-dinitrophenyl)carbamate

To a stirred solution of 2,4-dinitroaniline (9.15 g.; 0.05 mole) and 0.05 mole of pyridine in 125 ml. of acetone was added dropwise, at 15–20° C., 8.5 g. (0.05 mole) of 4-chloro-2-butynyl chlorocarbonate. Stirring was continued for 2 hours at ambient temperature. The crystalline precipitate which had formed was removed by filtration, washed with n-hexane and dried to give 4.1 g. (26%) of crystalline product melting at 121–122.5° C.

EXAMPLE 43

4-chloro-2-butynyl N-hexylcarbamate

To a stirred solution of 10.1 g. (0.1 mole) of n-hexylamine and 7.9 g. (0.1 mole) of pyridine in 150 ml. of benzene was added dropwise, at 10–15° C., 16.7 g. (0.1 mole) of 4-chloro-2-butynyl chlorocarbonate. The mixture was stirred for 2.5 hours at 10–15° C. and then poured into 100 ml. of water. The water-benzene mixture was shaken thoroughly in a separatory funnel, the benzene layer separated, washed with two 50 ml. portions of water and then dried over anhydrous sodium sulfate. The benzene solution was filtered and then concentrated under reduced pressure to about half volume. Addition of an equal amount of n-heptane and chilling precipitated a crystalline material which melted when warmed to room temperature. The melt was dissolved in benzene, filtered and an equal amount of n-hexane added with cooling. The material which separated was removed by filtration after chilling, dried over $P_2O_5$ and then heated at 40–50° C. and 1 mm. Hg for 3 hours to remove residual solvent. A dark oil which did not crystallize was obtained.

EXAMPLE 44

4-chloro-2-butynyl piperidinocarbamate

Piperidine (8.5 g.; 0.1 mole) was reacted with 4-chloro-2-butynyl chlorocarbonate (0.1 mole) in the presence of 0.1 mole of pyridine in benzene as described above. The resulting mixture was extracted with water, cold dilute hydrochloric acid, again with water and then dried over anhydrous sodium sulfate and magnesium sulfate. The benzene solution was filtered and the solvent removed from the filtrate by distillation under reduced pressure. The residual oil was treated with 3 ml. of benzene and 7 ml. of n-heptane. Cooling caused the separation of layers and the solvent was decanted. This process of addition of benzene and then n-heptane, cooling and decantation was repeated five times. The oily product was then filtered and heated at 40° C. under reduced pressure for 3 hours to give 2.9 g. of an orange oil which did not crystallize.

EXAMPLE 45

4-chloro-2-butynyl morpholinocarbamate

To a stirred solution of 8.7 g. (0.1 mole) of morpholine and 7.9 g. (0.1 mole) of pyridine in 150 ml. of dry, thiophene-free benzene was added dropwise, at about 10° C., 16.7 g. (0.1 mole) of 4-chloro-2-butynyl chlorocarbonate. The mixture was stirred for 2 hours then washed successively with water, dilute hydrochloric acid, dilute sodium bicarbonate and again with water. The benzene solution was dried over anhydrous sodium sulfate and magnesium sulfate and then filtered. The benzene was removed from the filtrate by distillation under reduced pressure and the oily residue dissolved in 5 ml. of benzene. The addition of 10 ml. of n-hexane resulted in the separation of an oil. The solvent layer was decanted and the process of dissolving in benzene and precipitating with n-hexane repeated. The residual solvent was removed by heating at about 40° C. under reduced pressure for 4 hours to give a brown oil which did not crystallize.

EXAMPLE 46

4-chloro-2-butynyl N-t-butylcarbamate

To a stirred solution of 7.3 g. (0.1 mole) of t-butylamine and 7.9 g. (0.1 mole) of pyridine in 150 ml. of benzene was added dropwise, at about 10° C., 16.7 g. (0.1 mole) of 4-chloro-2-butynyl chlorocarbonate. The resulting mixture was then stirred for 2 hours and allowed to stand overnight. The product was isolated as described in the previous example to give an oil which did not crystallize.

EXAMPLE 47

4-chloro-2-butynyl N-(2-pyridyl)carbamate

To a stirred solution of 9.4 g. (0.1 mole) of 2-aminopyridine in 150 ml. of benzene was added dropwise, at about 10° C., 16.7 g. (0.1 mole) of 4-chloro-2-butynyl chlorocarbonate over a period of 30 minutes. After the addition was completed, the mixture was stirred for 4 hours at 10–15° C. The mixture was then washed in a separatory funnel with an excess of 10% aqueous sodium bicarbonate solution, extracted with two small portions of 10% sodium bicarbonate and washed with several portions of water. During extraction it was necessary to break the emulsions which formed with saturated sodium chloride solution. A considerable amount of solid material which remained in suspension in the benzene layer was removed by filtration. The benzene filtrate was dried over sodium sulfate and magnesium sulfate and diluted with n-hexane. Chilling precipitated 0.7 g. of white, crystalline product which was removed by filtration. After recrystallization from a benzene–n-hexane mixture, the desired carbamate melted at 148–150° C.

The solid obtained by filtering the benzene solution above was triturated with dilute sodium carbonate and benzene and filtered. This process was repeated four times and the benzene filtrates combined, washed with water and dried over sodium sulfate and magnesium sulfate. Addition of n-hexane to the benzene solution and chilling precipitated 1.8 g. of crystalline material which was removed by filtration. Recrystallization from a benzene–n-hexane mixture gave an additional 1.5 g. of carbamate melting at 148–150° C.

EXAMPLE 48

*4-chloro-2-butynyl N-[3-(2-ketohexamethylene-imino)]carbamate*

To a stirred mixture of 12.3 g. (0.075 mole) of 3-amino-epsilon-caprolactam hydrochloride and 11.85 g. (0.15 mole) of pyridine in 120 ml. of chloroform was added dropwise, at about 10° C., 12.5 g. (0.075 mole) of 4-chloro-2-butynyl chlorocarbonate. Stirring was continued at 10–15° C. for 2 hours and the mixture allowed to stand overnight. Stirring was continued at room temperature for 2 hours and the mixture then poured into an equal volume of water. The chloroform layer was separated, extracted with several portions of water, then extracted successively with dilute hydrochloric acid, aqueous sodium bicarbonate and water. The chloroform solution was dried over anhydrous sodium sulfate and magnesium sulfate. n-Hexane was added and the solution cooled to precipitate the crystalline product. Filtration gave 3.2 g. of the carbamate melting at 162–164° C. Recrystallization from benzene gave the pure carbamate melting at 164–165.5° C.

Various changes and modifications of the invention can be made and, to the extent that such variations incorporate the spirit of this invention, they are intended to be included within the scope of the appended claims.

What is claimed is:
1. 4-chloro-2-butynyl N-(4-nitrophenyl)carbamate.
2. 4-chloro-2-butynyl N-(3-nitrophenyl)carbamate.
3. 4-chloro-2-butynyl N-(4-acetophenyl)carbamate.
4. 4-chloro-2-butynyl N-(4-phenylphenylcarbamate).
5. 4-chloro-2-butynyl N-(alpha-naphthyl)carbamate.
6. 4-chloro-2-butynyl N,N-diphenylcarbamate.
7. 4-chloro-2-butynyl N-(4-phenylazophenyl)carbamate.
8. 4-chloro-2-butynyl N-(4-hydroxyphenyl)carbamate.
9. 4-chloro-2-butynyl N-(4-carboxyphenyl)carbamate.
10. 4-chloro-2-butynyl N-(2-nitrophenyl)carbamate.
11. 4-chloro-2-butynyl N-(4-cyanophenyl)carbamate.
12. 4-halo-2-butynyl N-(nitrophenyl)carbamate.
13. 4-halo-2-butynyl N-(lower alkoxy substituted phenyl)carbamate.
14. Phenylene 1,2-bis(4-chloro-2-butynyl)carbamate.
15. 4-chloro-2-butynyl N-dodecylcarbamate.
16. 4-chloro-2-butynyl N-benzylcarbamate.
17. 4-chloro-2-butynyl N-cyclohexylcarbamate.

References Cited by the Examiner

UNITED STATES PATENTS

| | | | |
|---|---|---|---|
| Re. 20,869 | 10/38 | Bousquet et al. | 167—22 |
| Re. 22,750 | 4/46 | Tisdale et al. | 167—22 |
| 2,609,286 | 9/52 | Tischler | 71—2.5 |
| 2,610,116 | 9/52 | Goodhue et al. | 71—2.5 |
| 2,734,911 | 2/56 | Strain | 260—471 |
| 2,759,934 | 8/56 | Speeter | 260—247.2 |
| 2,759,935 | 8/56 | Speeter | 260—247.2 |
| 2,788,268 | 4/57 | Tursich | 260—471 |
| 2,906,614 | 9/59 | Hopkins et al. | 260—471 |

LORRAINE A. WEINBERGER, *Primary Examiner.*

IRVIN MARCUS, LEON ZITVER, *Examiners.*